No. 686,263. Patented Nov. 12, 1901.
J. CONLEY.
ORE SEPARATOR.
(Application filed Nov. 10, 1900.)
(No Model.) 2 Sheets—Sheet 1.

Witnesses
Palmer A. Jones.
George Holway

Inventor
John Conley
By Luther V. Moulton
Attorney

No. 686,263. Patented Nov. 12, 1901.
J. CONLEY.
ORE SEPARATOR.
(Application filed Nov. 10, 1900.)
(No Model.) 2 Sheets—Sheet 2.

Witnesses
Palmer A. Jones
George Hollway

Inventor
John Conley
By Luther V. Moulton
Attorney

UNITED STATES PATENT OFFICE.

JOHN CONLEY, OF DENVER, COLORADO.

ORE-SEPARATOR.

SPECIFICATION forming part of Letters Patent No. 686,263, dated November 12, 1901.

Application filed November 10, 1900. Serial No. 36,049. (No model.)

*To all whom it may concern:*

Be it known that I, JOHN CONLEY, a citizen of the United States, residing at Denver, in the county of Arapahoe and State of Colorado, have invented certain new and useful Improvements in Ore-Separators; and I do hereby declare the following to be a full, clear, and exact description of the invention, such as will enable others skilled in the art to which it appertains to make and use the same.

My invention relates to an improved ore-separator for separating gold ore from sand or pulverized rock; and its objects are to provide means for more effectually separating the ore, to provide means for economizing water, to provide a cheap, effective, and durable device, and to provide the same with certain new and useful features hereinafter more fully described, and particularly pointed out in the claims.

My device consists, essentially, of a rotary screen mounted within a casing adapted to contain water, a conveyer beneath the screen and in proximity thereto to move the sand that passes through the screen and to induce currents in the water, a pocket beneath the conveyer to receive the ore, means for removing the ore from the pocket, means for circulating the water within the casing and extracting the sand therefrom, and certain novel features of construction, as will more fully appear by reference to the accompanying drawings, in which—

Figure 1:
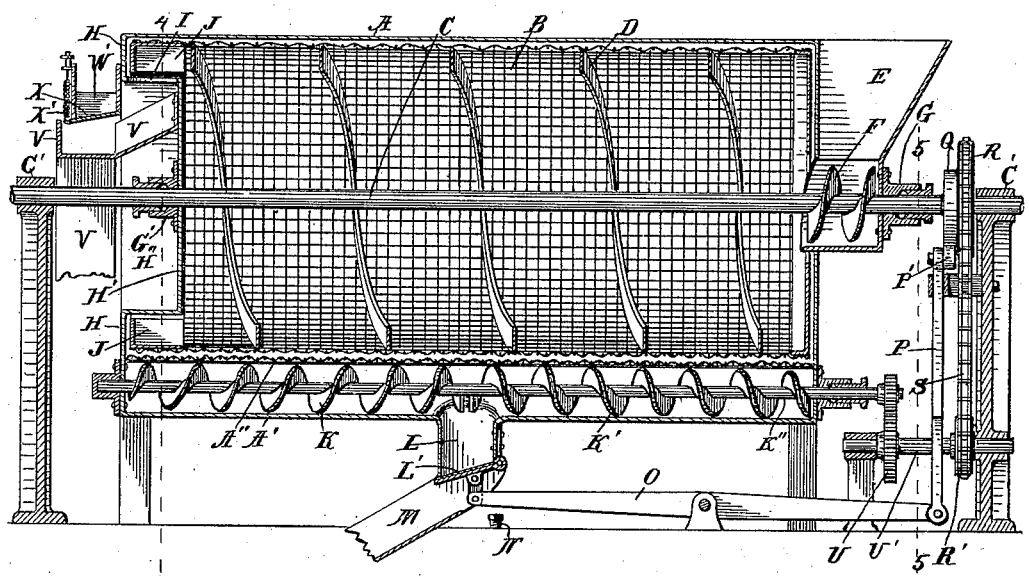
Figure 2:
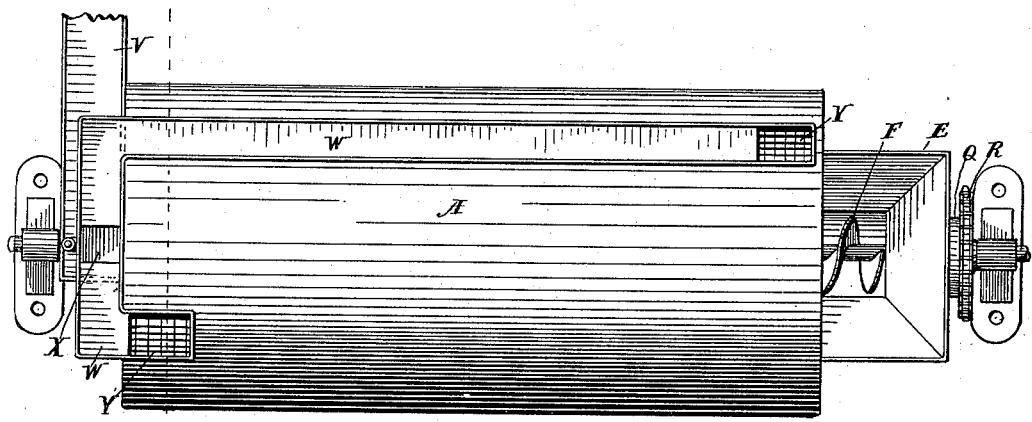
Figure 6:
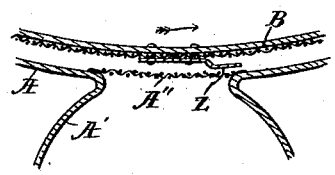
Figure 3:
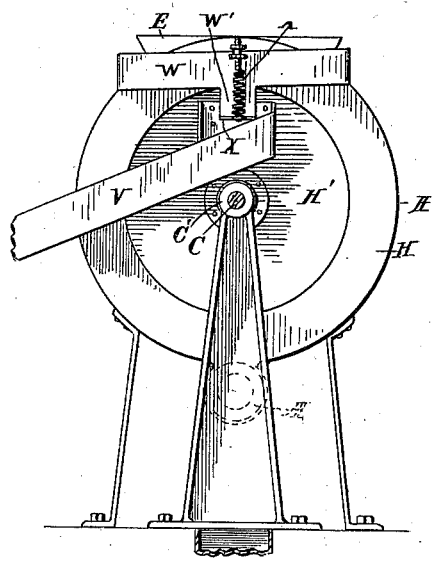
Figure 4:
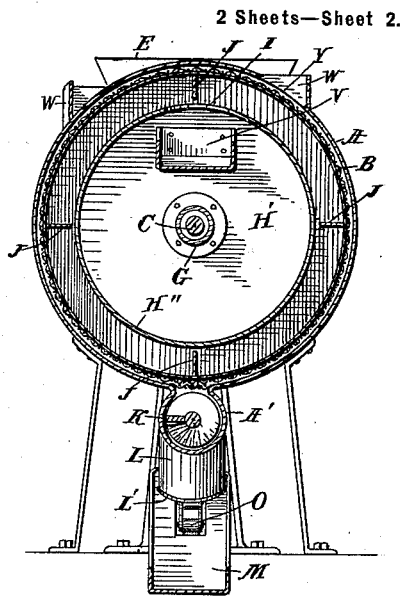
Figure 5:
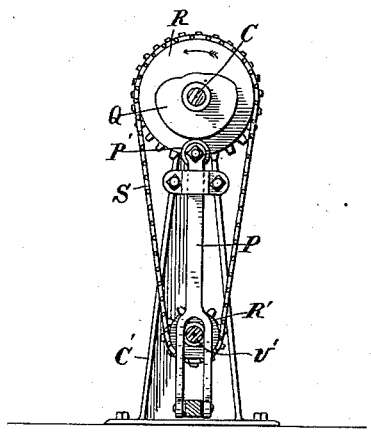

Figure 1 is a longitudinal vertical section of a device embodying my invention; Fig. 2, a plan view of the same; Fig. 3, an end elevation of the same; Fig. 4, a transverse section of the same on the line 4 4 of Figs. 1 and 2; Fig. 5, a sectional detail on the line 5 5 of Fig. 1, and Fig. 6 a detail showing a portion of the screen and case and the plates on the screen.

Like letters refer to like parts in all the figures.

A represents a suitable cylindrical case adapted to contain water and arranged with its axis horizontal. In the axis of the case is a shaft C, extending through stuffing-boxes G G' in the case and journaled in bearings C' C', arranged outside of the case and at a distance therefrom to avoid getting sand in the bearings and to permit of carrying water above the axis of the screen and case. Mounted on the shaft C and rotative within the case is a cylindrical screen B of suitable mesh to retain the coarser portions of the sand and permit the finer portions and the ore to pass through.

D is a spiral rib projecting inward from the screen to induce the sand to move longitudinally of the screen.

E is a hopper opening into the screen at one end and having a short conveyer F at the bottom mounted on the shaft C to force the sand into the screen. At the opposite end of the screen the case is provided with a head consisting of an outer annular portion H and an inwardly-projecting central portion H', connected by a cylindrical portion H'', surrounding which latter portion is an annular space traversed by inwardly-projecting buckets J to carry the sand upward and drop it through an opening I in the top of the cylindrical portion H''.

V is an inclined trough attached to the head H to receive the sand and carry the same away from the machine. At the bottom of the case A is a longitudinal slit or opening provided with a screen A'', and beneath this opening is a small cylindrical case A', within which case is a screw conveyer having oppositely-inclined portions K K' to stir the sand that passes through the screens and move the same toward the pocket L at the bottom of the case A' and also to cause a current or currents in the water toward the pocket and upward through the screen. This pocket is closed at the bottom by a valve L', which valve is held closed by a lever O, pivoted near the middle and connected to the valve at one end and having a push-rod P pivoted to the other end and extending upward through a suitable guide. Said rod is provided with a roll P', engaging a cam Q on the shaft C, which cam is so formed that when the full side engages the roll the lever will be depressed and the valve held closed, and when the reduced portion thereof is opposite the roll the lever will be released and the valve will be opened by gravity and discharge the contents of the pocket L into the trough M. A set-screw N is provided to limit and adjust the opening of the valve L' to discharge the ore and sand from the pocket and to close again before too much water escapes. To drive the conveyers K K', the shaft K" of the conveyer is connected to the shaft C by means of the gears U, the counter-shaft U', the sprocket-wheels R' R, and the chain S, the wheels and gears being so proportioned as to give the conveyer a much more rapid rotation than that of the screen.

I connect the machine with any convenient supply of water (not shown) and provide enough to barely keep the machine full up to the overflow I. To circulate the water in the machine, I provide openings in the case at Y Y', located about at the water-level, the opening at Y' being a little the higher and adjacent to the upwardly-moving side of the screen and an inclined trough W extending between the said openings. On the outside of the screen I provide any convenient number of strips Z, having their advance edges bent outwardly. These strips serve to secure the edges of the screen, and the outwardly-bent edges thereof serve to take up any sand that may accumulate between the screens B and A" and pass the sand back through the screen B. They also serve to assist in raising the water at one side of the case to cause the water to flow out of the opening Y'. That part of the conveyer acting oppositely to the spiral D tends to carry the sand backward, and thus keeps it longer in the machine. The proportions of the opposing parts of the conveyer may be varied as occasion requires, even to omitting one part entirely, and the pocket located accordingly. So, also, the screen A" may be advantageously omitted in some cases.

In operation the finer sand and the particles of ore pass through the screens into the part A'. The ore being heaviest tends to settle to the bottom and accumulate in the pocket L, together with a small part of the sand. The rapid rotation of the conveyer stirs the sand and some of the lighter portions pass upward through the screens and toward the discharge end of the machine. The opposing currents of water and sand meet over the pocket and rise through the screens. The collision of these currents tends to drop the heavier particles of ore into the pocket, while the sand passes upward with the current of water through the screens and thence toward the left-hand end of the cylinder, being finally lifted up by the plates J and discharged from the machine through the opening I and trough V. The screen B raises the water at the rising side of the screen. This causes an outward flow of water through the opening Y' into the trough W, which trough being inclined downward to the opening Y the water flows back into the case again through said opening. Any sand carried out by the water falls into the pocket W' and is trapped out by means of the valve X, the same being held closed by a spring X' until sufficient sand accumulates to overcome the resistance of said spring, and thus opens said valve.

Having thus fully described my invention, what I claim, and desire to secure by Letters Patent, is—

1. The combination of a rotary screen, a conveyer in proximity to the lower side of the screen, a casing to contain water and having its walls near the screen and conveyer, whereby the agitation of the conveyer causes the sand to pass upward through the screen, means for removing ore from the bottom of the casing, and means for passing sand through the screen, substantially as described.

2. The combination of a rotary screen, a conveyer in proximity to the lower side of the screen, a casing to contain water and having its walls near to the screen and conveyer, whereby the agitation of the conveyer causes the sand to return to the interior of the screen; a pocket beneath the conveyer, means for removing the contents of the pocket, and means for passing sand through the screen, substantially as described.

3. The combination of a rotary screen, a conveyer in proximity to the lower side of the screen and having oppositely-acting portions, a casing to contain water and having its walls near to the screen and conveyer, whereby the conveyer causes an upward current of sand and water through the screen, a pocket beneath the adjacent ends of the oppositely-acting portions of the conveyer, means for removing the contents of the pocket, and means for passing sand through the screen, substantially as described.

4. The combination of a cylindrical screen, having an inwardly-projecting spiral rib to move the contents of the screen in one direction, a conveyer located in proximity to the lower side of the screen and moving the sand in the opposite direction, a casing to contain water and having its walls near the screen and conveyer, whereby the agitation of the conveyer causes the sand to pass back into the interior of the screen, means for removing ore and sand from the bottom of the casing, and means for passing sand through the screen and casing substantially as described.

5. The combination of a rotary cylindrical screen, a casing inclosing the same and adapted to contain water, openings in the casing near the water-level and located at opposite sides thereof, and a trough connecting said openings, substantially as described.

6. The combination of a rotary cylindrical screen, a casing inclosing the same and adapted to hold water, openings in the casing at opposite sides and at opposite ends thereof and near the water-level, and a trough connecting said openings, substantially as described.

7. The combination of a rotary cylindrical screen, a casing inclosing the screen and adapted to hold water, openings in the casing and at opposite sides thereof and near the water-level, a trough connecting said openings, a pocket in the trough, and means for removing the contents of the pocket, substantially as described.

8. The combination of a rotary cylindrical screen, a casing inclosing the screen and adapted to hold water, openings in the casing at opposite sides thereof and near the water-level, a trough connecting said openings, a pocket in said trough, a valve closing the bottom of the said pocket, and a spring to hold the said valve closed, substantially as described.

9. The combination of a rotary cylindrical screen, a casing inclosing the same and having a longitudinal slit in the bottom thereof, a smaller casing below the slit, a screw conveyer in the said casing, a pocket beneath the conveyer, means for removing the contents of the pocket, and plates on the screen having outwardly-projecting portions, substantially as described.

10. The combination of a rotary cylindrical screen, a casing surrounding the screen and having a longitudinal slit in the bottom thereof, a screen closing said slit, a casing below the said slit, a conveyer in said casing, a pocket below the conveyer, a valve at the bottom of the pocket, means for periodically opening and closing the valve, and plates on the screen having outwardly-projecting portions, substantially as described.

11. The combination of a rotary cylindrical screen, a casing inclosing the screen, a shaft in the axis of the screen and casing, stuffing-boxes on the casing and surrounding the shaft, and bearings for the shaft located outside the stuffing-boxes, whereby the bearings are protected from sand and water carried above the axis of the screen.

12. The combination of a rotary cylindrical screen, a rotary conveyer beneath the same and having oppositely-acting portions, a casing inclosing the screen and conveyer, a hopper at one end of the casing, a head at the other end of the casing having an inwardly-projecting portion and having an opening at the top, plates on the screen traversing around the inwardly-projecting portion of the head, a pocket beneath the adjacent ends of the conveyer, a valve at the bottom of the pocket, a lever to operate the valve, a cam to operate the lever, and means for rotating the screen, conveyer, and cam, substantially as described.

13. The combination of a rotary cylindrical screen adapted to receive sand at one end and to discharge the same at the other end, a conveyer beneath the screen and adapted to move the water and sand toward the receiving end of the screen, a case inclosing the screen and conveyer and adapted to hold water, a pocket beneath the conveyer, openings in the opposite side of the case and a trough connecting the said openings, substantially as described.

14. The combination of a rotary cylindrical screen adapted to receive sand at one end and to discharge the same at the other end, a conveyer close beneath the screen and adapted to convey water and sand toward the receiving end of the screen, a case inclosing the screen and conveyer, openings in the case near the water-level and at opposite sides and opposite ends of the case, a trough connecting said openings, a pocket in the bottom of the case, and a pocket in the bottom of the trough, and means for removing the contents of the said pockets, substantially as described.

15. The combination of a rotary cylindrical screen, a case inclosing the screen and adapted to contain water, and having openings at opposite sides and near the water-level, a trough connecting said openings and plates on the outside of the screen adapted to carry water up and discharge the same through the exit-openings of the case, substantially as described.

In testimony whereof I affix my signature in presence of two witnesses.

JOHN CONLEY.

Witnesses:
WILLIAM J. BURKE,
GEO. W. TAYLOR.